United States Patent
Moore, Jr. et al.

(10) Patent No.: US 8,023,626 B2
(45) Date of Patent: *Sep. 20, 2011

(54) SYSTEM AND METHOD FOR PROVIDING LANGUAGE INTERPRETATION

(75) Inventors: James L. Moore, Jr., Carmel, CA (US); Louis Provenzano, Monterey, CA (US)

(73) Assignee: Language Line Services, Inc., Monterey, CA (US)

( * ) Notice: Subject to any disclaimer, the term of this patent is extended or adjusted under 35 U.S.C. 154(b) by 910 days.

This patent is subject to a terminal disclaimer.

(21) Appl. No.: 11/277,318

(22) Filed: Mar. 23, 2006

(65) Prior Publication Data

US 2007/0064916 A1    Mar. 22, 2007

Related U.S. Application Data

(63) Continuation-in-part of application No. 11/226,526, filed on Sep. 13, 2005, now Pat. No. 7,792,276.

(51) Int. Cl.
*H04M 11/00* (2006.01)
*G06Q 10/00* (2006.01)

(52) U.S. Cl. .............. 379/90.01; 379/93.05; 379/265.12

(58) Field of Classification Search .............. 379/90.01, 379/93.5, 93.03, 93.06, 265.01, 265.12, 127.01, 379/155, 207.14, 207.15, 213.01; 705/1–2, 705/400

See application file for complete search history.

(56) References Cited

U.S. PATENT DOCUMENTS

| | | | |
|---|---|---|---|
| 4,445,211 A | 4/1984 | Webber | |
| 4,691,347 A | 9/1987 | Stanley et al. | |
| 4,882,681 A | 11/1989 | Brotz | |
| 5,136,633 A | 8/1992 | Tejada et al. | |
| 5,353,335 A | 10/1994 | D'Urso et al. | |
| 5,373,549 A | 12/1994 | Bales et al. | |

(Continued)

FOREIGN PATENT DOCUMENTS

EP    0 601 710    6/1994

(Continued)

OTHER PUBLICATIONS

Carey Gillam, "Language Line Gives Guests a Chance to Reach Out Touch a Translator", The Kansas City Business Journal, Aug. 30, 1991, p. 2, vol. 9 No. 50.

(Continued)

*Primary Examiner* — Melur Ramakrishnaiah
(74) *Attorney, Agent, or Firm* — Patent Ingenuity, P.C.; Samuel K. Simpson

(57) ABSTRACT

A method and system of providing a language interpretation service is disclosed. A language access number, such as an 811 number, can be provided. The language access number can be used to place a telephone call to a language interpretation service for language assistance. A language access telephone call is received at the language interpretation service provider from a caller speaking a first language. The caller places the language access telephone call by dialing the language access number. The caller has at least one business need. The first language is identified so as to provide the customer with an interpreter that can translate between a first language and a second language. The interpreter can be associated with the language interpretation service provider. The interpreter can telephonically engage an agent representing a merchant that can serve the at least one business need of the caller. The first agent speaks the second language and the interpreter translates a conversation between the caller and the agent.

44 Claims, 7 Drawing Sheets

U.S. PATENT DOCUMENTS

| | | | |
|---|---|---|---|
| 5,375,164 A | 12/1994 | Jennings | |
| 5,392,343 A * | 2/1995 | Davitt et al. | 379/265.12 |
| 5,426,706 A | 6/1995 | Wood | |
| 5,509,060 A | 4/1996 | Hall et al. | |
| 5,544,229 A | 8/1996 | Creswell et al. | |
| 5,590,186 A | 12/1996 | Liao et al. | |
| 5,684,867 A | 11/1997 | Gesslein, Jr. et al. | |
| 5,749,075 A | 5/1998 | Toader et al. | |
| 5,794,218 A | 8/1998 | Jennings et al. | |
| 5,797,092 A | 8/1998 | Cox et al. | |
| 5,825,863 A | 10/1998 | Walker | |
| 5,875,422 A | 2/1999 | Eslambolchi et al. | |
| 5,884,246 A | 3/1999 | Boucher et al. | |
| 5,937,051 A | 8/1999 | Hurd et al. | |
| 5,953,400 A | 9/1999 | Rosenthal et al. | |
| 5,960,070 A | 9/1999 | O'Donovan | |
| 5,970,124 A | 10/1999 | Csaszar et al. | |
| 5,991,748 A | 11/1999 | Taskett | |
| 6,038,292 A | 3/2000 | Thomas | |
| 6,069,939 A | 5/2000 | Fung et al. | |
| 6,097,806 A | 8/2000 | Baker et al. | |
| 6,115,458 A | 9/2000 | Taskett | |
| 6,134,306 A | 10/2000 | Lautenschlager et al. | |
| 6,161,082 A | 12/2000 | Goldberg et al. | |
| 6,205,215 B1 | 3/2001 | Dombakly | |
| 6,208,851 B1 | 3/2001 | Hanson | |
| 6,227,972 B1 | 5/2001 | Walker et al. | |
| 6,229,879 B1 | 5/2001 | Walker et al. | |
| 6,246,755 B1 | 6/2001 | Walker et al. | |
| 6,263,058 B1 | 7/2001 | Lautenschlager et al. | |
| 6,289,088 B1 | 9/2001 | Bruno et al. | |
| 6,292,769 B1 | 9/2001 | Flanagan et al. | |
| 6,301,566 B1 | 10/2001 | Costello | |
| 6,337,903 B1 | 1/2002 | Manner | |
| 6,363,411 B1 | 3/2002 | Dugan et al. | |
| 6,381,316 B2 | 4/2002 | Joyce et al. | |
| 6,597,765 B1 | 7/2003 | Ksiazek | |
| 6,665,387 B2 | 12/2003 | Hannu | |
| 6,690,932 B1 | 2/2004 | Barnier et al. | |
| 6,760,411 B2 | 7/2004 | Dybedokken et al. | |
| 6,801,602 B2 | 10/2004 | Glossbrenner | |
| 6,826,269 B2 | 11/2004 | Afana | |
| 6,856,674 B1 | 2/2005 | De Trana et al. | |
| 6,907,256 B2 | 6/2005 | Hokao | |
| 6,920,487 B2 | 7/2005 | Sofer et al. | |
| 6,963,557 B2 | 11/2005 | Knox | |
| 6,999,758 B2 | 2/2006 | Pence et al. | |
| 7,006,604 B2 | 2/2006 | Engelke | |
| 7,068,668 B2 | 6/2006 | Feuer | |
| 7,184,539 B2 | 2/2007 | Colson et al. | |
| 7,307,651 B2 | 12/2007 | Chew | |
| 7,376,415 B2 | 5/2008 | Surette | |
| 7,539,296 B2 * | 5/2009 | Basson et al. | 379/265.12 |
| 2001/0032878 A1 | 10/2001 | Tsiounis et al. | |
| 2001/0034599 A1 | 10/2001 | Kage et al. | |
| 2001/0051514 A1 | 12/2001 | Lindholm | |
| 2002/0046035 A1 | 4/2002 | Kitahara et al. | |
| 2002/0069048 A1 | 6/2002 | Sadhwani et al. | |
| 2002/0069067 A1 | 6/2002 | Klinefelter et al. | |
| 2002/0097854 A1 | 7/2002 | Bauer | |
| 2002/0136381 A1 | 9/2002 | Shaffer et al. | |
| 2002/0152063 A1 | 10/2002 | Tokieda et al. | |
| 2002/0169592 A1 | 11/2002 | Aityan | |
| 2002/0181669 A1 | 12/2002 | Takatori et al. | |
| 2003/0008639 A1 | 1/2003 | Kanegae | |
| 2003/0013438 A1 | 1/2003 | Darby | |
| 2003/0095542 A1 | 5/2003 | Chang et al. | |
| 2003/0144912 A1 | 7/2003 | McGee | |
| 2003/0149557 A1 | 8/2003 | Cox et al. | |
| 2003/0154122 A1 | 8/2003 | Jackson, Jr. et al. | |
| 2003/0158722 A1 | 8/2003 | Lord | |
| 2003/0163300 A1 | 8/2003 | Kasvand et al. | |
| 2003/0208352 A1 | 11/2003 | Lee | |
| 2004/0014462 A1 | 1/2004 | Surette | |
| 2004/0017897 A1 | 1/2004 | Engelke | |
| 2004/0092293 A1 | 5/2004 | Lee et al. | |
| 2004/0096050 A1 | 5/2004 | Das et al. | |
| 2004/0128139 A1 | 7/2004 | Ilan et al. | |
| 2004/0165579 A1 | 8/2004 | Mandle | |
| 2004/0218737 A1 | 11/2004 | Kelly | |
| 2004/0267538 A1 | 12/2004 | Obuchi et al. | |
| 2005/0084078 A1 | 4/2005 | Miller et al. | |
| 2005/0122959 A1 | 6/2005 | Ostrover et al. | |
| 2005/0129215 A1 | 6/2005 | Parker | |
| 2005/0149335 A1 | 7/2005 | Mesbah et al. | |
| 2005/0152530 A1 | 7/2005 | Pence et al. | |
| 2005/0209859 A1 | 9/2005 | Tenembaum et al. | |
| 2005/0216252 A1 | 9/2005 | Schoenbach et al. | |
| 2005/0251421 A1 * | 11/2005 | Chang et al. | 705/2 |
| 2005/0261890 A1 | 11/2005 | Robinson | |
| 2005/0272414 A1 | 12/2005 | Vallarino | |
| 2006/0023869 A1 | 2/2006 | Reynolds et al. | |
| 2006/0026001 A1 | 2/2006 | Bravin et al. | |
| 2006/0126821 A1 | 6/2006 | Sahashi | |
| 2006/0165225 A1 | 7/2006 | Sahashi | |
| 2007/0041370 A1 | 2/2007 | Cleveland | |
| 2007/0050306 A1 * | 3/2007 | McQueen | 705/77 |
| 2007/0064913 A1 | 3/2007 | Shaffer et al. | |
| 2007/0064915 A1 | 3/2007 | Moore et al. | |
| 2007/0064916 A1 | 3/2007 | Moore et al. | |
| 2007/0071181 A1 | 3/2007 | Hwang | |
| 2007/0121903 A1 | 5/2007 | Moore et al. | |
| 2008/0049929 A1 | 2/2008 | Miloslavsky et al. | |
| 2008/0095355 A1 | 4/2008 | Mahalaha et al. | |
| 2008/0205629 A1 | 8/2008 | Basson et al. | |
| 2008/0240388 A1 | 10/2008 | Surette | |
| 2009/0190748 A1 | 7/2009 | Chishti et al. | |
| 2010/0026339 A1 | 2/2010 | Koo | |

FOREIGN PATENT DOCUMENTS

| | | | |
|---|---|---|---|
| EP | 1 041 801 A2 | | 10/2000 |
| EP | 1 545 110 | | 6/2005 |
| EP | 1 545 111 | | 6/2005 |
| JP | 2001 313721 | | 11/2001 |
| JP | 2002 073783 | | 3/2002 |
| JP | 2002 142024 | | 5/2002 |
| JP | 2002 152387 | | 5/2002 |
| JP | 2002 163400 | | 6/2002 |
| JP | 2002 237897 | | 8/2002 |
| JP | 2002 244842 | | 8/2002 |
| JP | 2003 069720 | | 3/2003 |
| JP | 2003 110702 | | 4/2003 |
| JP | 2003110702 A * | | 4/2003 |
| JP | 2003 234833 | | 8/2003 |
| JP | 2004 023262 | | 1/2004 |
| JP | 2004 260430 | | 9/2004 |
| JP | 2005 286979 | | 10/2005 |
| RU | 2 143 135 C1 | | 12/1999 |
| WO | WO 2004/030330 | | 4/2004 |

OTHER PUBLICATIONS (Author not indicated), "The Phone Call That Speaks Your Language", Money magazine, Jun. 1991, p. 32, vol. 20 No. 6.

(Author not indicated), "News and Reports—AT&T Language Line", Managing Service Quality, 1995, vol. 5 No. 1.

(Author not indicated), "NHS Direct Translator—National Health Services", Chemist & Druggist magazine, Sep. 25, 2004.

Blayne Cutler, "Multilingual Marketers Work for the Police", American Demographics, Jan. 1992, p. 10, vol. 14 No. 1.

(Author not indicated), "Telephone Translators Covered in Deal Between SSH and California Company", Hospital Materials Management, Jun. 2002.

Frederick Gabriel, "Providers Say 'Ah', 'Ay' and 'Oy'—Health Care Providers Which Treat Non-English Patients Must Contend With Cultural and Linguistic Challenges", Crain's New York Business, Jan. 26, 1998, 14(4):30.

Brendan B. Read, "Gracias Por Llamar (Thank You for Calling)", Call Center Magazine, Oct. 2003, p. 32, vol. 16 No. 10.

Phil Zinkewicz, "In Any Other Language—Translators Handle Emergency Calls or Business/Industry Needs", Insurance Advocate, Mar. 8, 2004, p. 2.

Language Lines Services, "Language Line Services Tutorial".

Language Line Services, "Commonly Asked Interpretation Questions and Answers", Jun. 22, 2004.

Language Line Services, "Over-The-Phone Language Interpretation . . . How Does That Work Exactly?", http://www.languageline.com/prod_serv_interp.php, 2 pages.

Tele-Interpreters, "Tele-Interpreters On-Call", http://web.archive.org/web/19990128224906/http://www.teleinterpreters.com/, 8 pages.

Tele-Interpreters, "Over-The-Phone Language Interpretation Services", http://www.teleinterpreters.com/otp_interpretation_services.aspx, 3 pages.

Network Omni, "On-Demand and Global OPI Services. 24/7/365 in 150 Languages", http://www.networkomni.com/opi-offering.asp, 2 pages.

Network Omni, "Translating on Demand in 140 Languages", http://web.archive.org/web/20000308070011/www.networkomni.com/TranslationLine.html, 2 pages.

* cited by examiner

SYSTEM AND METHOD FOR PROVIDING LANGUAGE INTERPRETATION

RELATED APPLICATIONS

This application is a Continuation-In-Part of U.S. patent application Ser. No. 11/226,526, filed on Sep. 13, 2005 now U.S. Pat. No. 7,792,276, entitled LANGUAGE INTERPRETATION CALL TRANSFERRING IN A TELECOMMUNICATIONS NETWORK, which incorporated by reference in its entirety.

BACKGROUND

1. Field of the Disclosure

The present disclosure relates generally to offering language interpretation services. In particular, the present disclosure relates to providing a language access line for language interpretation.

2. General Background

Modern telecommunications systems permit international multilingual communication which in turn is based on effectively communicating in a common language. Many businesses increasingly depend on global commerce, specifically on goods and services flowing freely and clearly. An integral part of business transactions is oral communication that is understood immediately. Often, however, the customer and the business do not speak the same language. In order to provide better service and improve commercial transactions with customers, many businesses subscribe to translation services to perform such necessary translation between the customer and the business.

When a customer calls a business speaking a different language, a language interpreter is procured, and the transaction is conducted. However, the customer experience can be frustrating and confusing at times. For each business transaction that the customer requires, the customer has to call each business and wait for an interpreter to join the telephone call. In addition, there are businesses that do not provide language interpretation services, sometimes transgressing legal mandates that require equal language access for all consumers.

SUMMARY

In one aspect, there is a method of providing a language interpretation service. A language access number is provided. The language access number can be for example 811. In addition, the language access number can be a toll-free number. The language access number can be used to place a telephone call to a language interpretation service for language assistance. A language access telephone call is received at the language interpretation service provider from a caller speaking a first language. The caller can place the language access telephone call by dialing the language access number. The caller makes the call to the language access number to resolve at least one business need. The first language is identified so as to provide the caller with an interpreter that can translate between a first language and a second language. The interpreter can be associated with the language interpretation service provider. In addition, the interpreter can telephonically engage an agent representing a merchant that can serve the at least one business need of the caller. The agent can speak the second language and the interpreter translates a conversation between the caller and the agent. The conversation between the caller and the agent can relate to a business transaction between the caller and the merchant.

In a further aspect of the method, a further determination can be made to establish whether the caller elects to be telephonically connected to a business partner of the merchant. If the caller elects to be connected to the business partner, the interpreter telephonically engages a partner agent representing the business partner. The partner agent can speak the second language and the interpreter then translates a subsequent conversation between the caller and the partner agent. The type of business need of the caller can also be determined. In addition, the merchant that can address the business need of the caller can also be determined.

In another aspect of the method, a first billing that accounts a time count accruing from a time at which the language access telephone call starts until a time at which the agent representing the merchant is engaged is established. The first billing is paid by a government entity, a business entity, the interpretation service provider, or the caller.

In another aspect of the method, a second billing that accounts a time count accruing from a time at which the agent representing the merchant is engaged until at time at which the partner agent is engaged can be established. The second billing is paid by a government entity, a business entity, the interpretation service provider, or the caller.

In one aspect, the merchant can be a bank, a health care provider, a government entity, an airline, a rental car agency, a hotel, a travel agency, an amusement park, a resort, a casino, a cruise line, a public transportation agency, a financial company, an insurance company, or a telecommunications company. The first and the second languages can be any one of English, Spanish, German, French or Chinese. Any other languages are also contemplated.

In yet another aspect of the method, the telephone call is first received by a private branch exchange that routes the telephone call to the interpreter. The interpreter can be located remotely from the business facilities of the language interpretation service provider.

In another embodiment, there is another method of providing language interpretation service. A language access number is provided. The language access number can be for example 811. The language access number can be a toll-free number. The language access number can be used to place a telephone call to a language interpretation service for language assistance. A language access telephone call is received at the language interpretation service provider from a caller speaking a first language. The caller can place the language access telephone call by dialing the language access number. The first language is identified so as to provide the caller with an interpreter that can translate between a first language and a second language. The interpreter is associated with the language interpretation service provider. The interpreter can telephonically engage a first agent representing a first business that can serve at least one business need of the caller. The first agent can speak the second language and the interpreter translates a conversation between the caller and the first agent. A determination is made to establish whether the caller elects to be connected to a second business. If the caller elects to be connected to a second business, the interpreter telephonically engages a second agent representing the second business. The second agent speaks the second language and the interpreter translates a second conversation between the caller and the second agent.

In yet another aspect, there is a system for providing language interpretation. The system can comprise an incoming call telephonic module and an outgoing call telephonic module. The incoming call telephonic module receives an incoming telephone call from a caller speaking a first language. A language access number can be used to place the incoming telephone call to a language interpretation service for language assistance. The incoming call telephonic module can be associated with a language interpretation provider. The caller being greeted in the first language by an interpreter associated with the language interpretation service provider. The outgoing call telephonic module permits the interpreter to telephonically engage an agent representing a merchant. The agent can speak a second language and the interpreter translates a conversation between the caller and the agent.

DRAWINGS

DETAILED DESCRIPTION

Figure 1A:
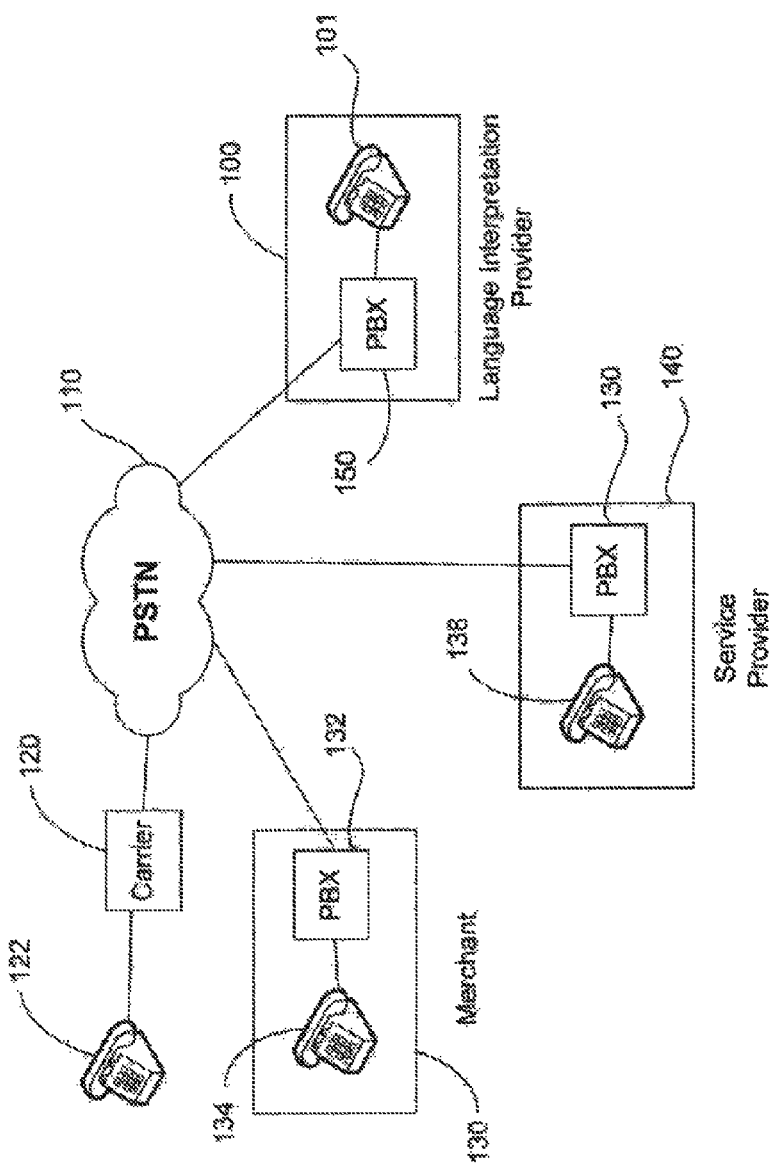
FIG. 1A illustrates a component diagram of a system for providing language interpretation services through a language access number.

A method and system to provide a language interpretation access line is disclosed. A language access line number can be provided to customers of any language. The language access line number can be a toll-free number. An exemplary toll-free number can be 811. Any other language access number can be utilized. Customers speaking any language can dial the language access line number and be assisted by an interpreter speaking the customer's language. The interpreter can assist the customer to identify business needs, servicing, or any other needs. In addition to interpretation services and facilitate communication with third parties. For example, the interpreter can also act as an operator that connects the caller to multiple businesses, etc. The interpreter can assist the customer in the native language of the customer. The interpreter can connect, in a three-way call, the customer, the business entity or merchant, and the interpreter. The customer can be connected with representatives of banks, hospitals, government agencies, companies, merchants, service providers, or any other public or private entity. The customer can then conduct any transaction with the public or private entity with the assistance of the interpreter.

In addition, the method and system provided herein permit the customer to conduct transactions with a second company or private or public entity. The transaction with the second company can be conducted in the same call once the first transaction has ended. Moreover, the same interpreter that assists the customer in the first call can assist the customer in the second call.

In addition, the second company engaged to transact business with the customer can be a company the offers products or services that are complementary to those of the first company. Modern companies engage in agreements with other companies that offer complementary products and services. As part of these agreements, customer telephone calls are transferred from one customer center to that of the complementary company. When the customer is a limited English proficiency (LEP) caller, and an interpreter is on the line with the first company, the second company would benefit from receiving the call with the customer and the interpreter on the line. In another embodiment, calls can to be billed to the company using the phone line and the interpreter time. Thus, once a call is transferred, the first company stops incurring interpretation costs, while the second company that engaged the customer starts incurring interpretation costs.

The system and method disclosed herein permits non-English speaking customers to be handled in the same way as English speaking callers, thus providing partner companies the opportunity to expand their customer base and to significantly increase revenue. Furthermore, revenue potential is also increased because non-English speaker customers are much more likely to remain on the line and conduct business with other businesses offering in-language services when the interpreter remains on the call.

A caller using this method will further benefit by having a source of affiliated companies offering language interpretation services. In one example, an non-English-speaking caller that is connected to an airline company can be the option of having the call transferred to a car rental company call center once the caller has completed all airline related concerns. If the customer accepts the transfer, the process benefits all of the parties involved. The airline benefits from a referral fee paid by the car rental company. The car rental company benefits from the contact with a receptive customer in need of car rental services. Finally, the customer benefits from reducing the complexity of the travel-planning process.

FIG. 1A illustrates a component diagram of a language interpretation service in a communications network. The communications network allows customer requiring language interpretation to communicate telephonically with any private or public entity. For example, a limited-English-proficiency (LEP) caller 122 can make a phone call through a public switch network 110 to a language access number (e.g., 811) in order to conduct a business transaction.

The telephone call is received by a language interpretation provider 100. A language interpretation provider 100 assists the LEP caller 122 to transact business by providing assistance of an interpreter 101. When a LEP caller 122 calls the language access number, the call from the LEP caller 122 can be routed through a carrier 120 connected to the public switch network 110. In another embodiment, the carrier 120 can be configured to directly route the call to a language interpretation provider 100. The call can then be routed to the language interpretation provider 100, and thereafter be routed to a primary private branch exchange 150. After the call is routed to a private branch exchange 150, an interpreter 101 can receive the phone call from the LEP caller 122. The private branch exchange 150 may or may not be part of the language interpretation provider 100.

In another embodiment, the call can be received at an incoming call telephonic module (not shown), wherein an incoming telephone call from the LEP caller 122 is received. The incoming call telephonic module is part of the language interpretation provider infrastructure. For example, the incoming call telephonic module can be part of the private branch exchange 150.

The interpreter 101 assists the LEP caller 122 to determine what type of business need, or service the LEP caller 122 needs. In one embodiment, the interpreter 101 assists the LEP caller 122 to establish whether the LEP caller's 122 business needs involves an emergency. In one embodiment, the interpreter 101 assists the LEP caller 122 to transact business with a merchant 130. The interpreter 101 can then connect the phone call, through the public switch telephone network 110, to a customer service representative 134 of the merchant 130 through a corresponding private branch exchange 132. In another embodiment, the LEP caller 122 does not have a business need but instead simply requests a service. In one embodiment, the interpreter 101 can make a phone call through an outgoing call telephonic module (not shown). The outgoing telephonic module permits the interpreter 101 to telephonically connect or engage an agent representing the merchant 130.

In another embodiment, the interpreter 101 assists the LEP caller 122 to transact business with a service provider 140. The interpreter 101 can then connect the phone call, through the public switch telephone network 110, to a customer service representative 138 of the service provider 130 through a corresponding private branch exchange 130.

Figure 1B:
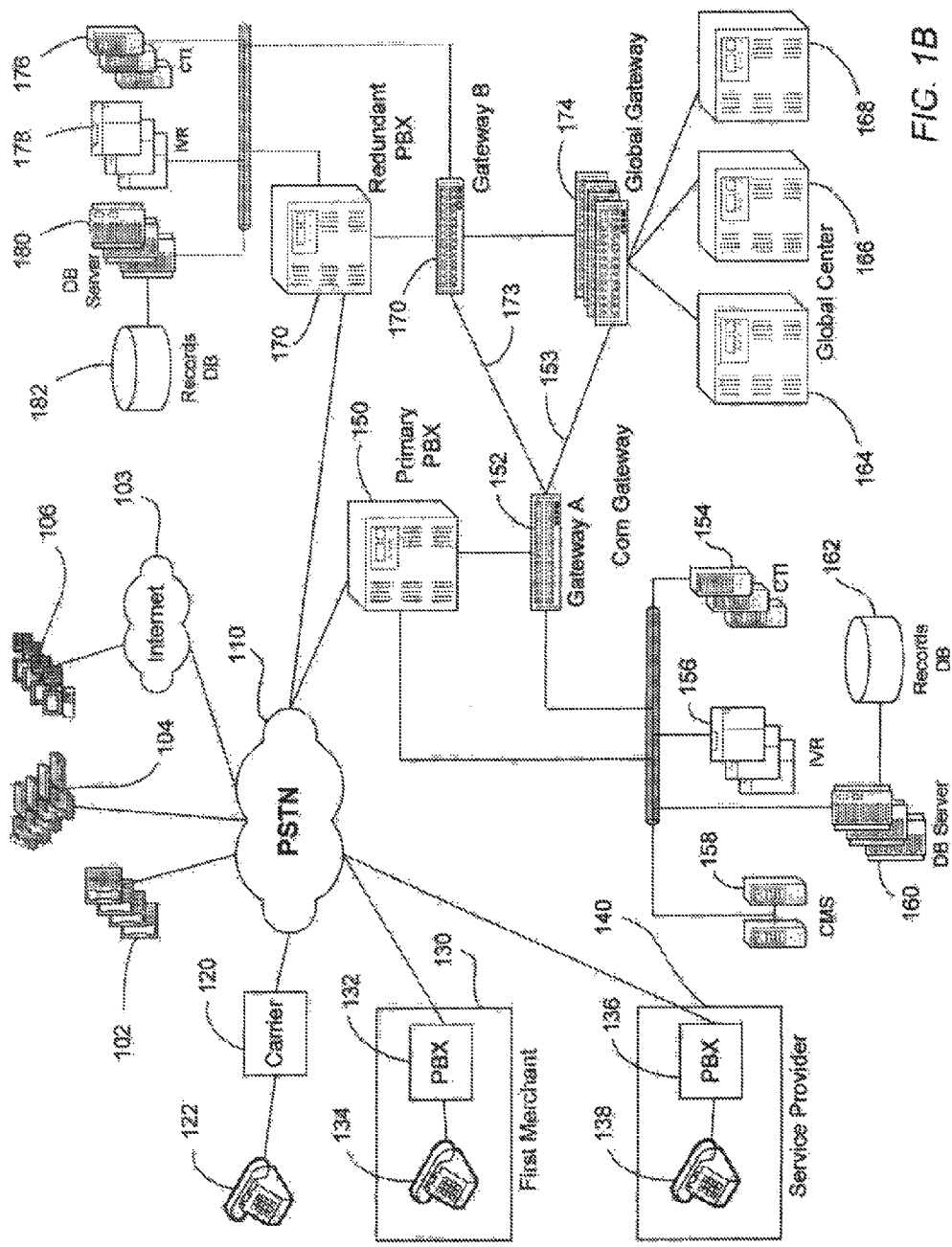
FIG. 1B illustrates an exploded component diagram of a system for providing language interpretation services through a language access number.

FIG. 1B illustrates an exploded component diagram of a language interpretation service in a communications network. The language interpretation provider 100 can be equipped with a primary private branch exchange 150 and a redundant private branch exchange 170. As such, the language interpretation provider 100 can have at least two call centers that can provide service to incoming calls that need language translation and assistance. Incoming calls received can be mostly language access number calls.

In one embodiment, the primary private branch exchange 150 can receive all the direct incoming phone calls from LEP callers 122. In another embodiment, the primary private branch exchange 150 can receive calls from the merchant 130 inquiring for help. The primary private branch exchange 150 can then service the phone calls by connecting the interpreter 101 that can allow the LEP caller 122 to conduct business with the merchant 130. In another embodiment, if the primary private branch exchange 150 is saturated with phone calls, or is unable to handle a call volume received, the redundant private branch exchange 170 can take all calls routed to the private branch exchange 150. The redundant private exchange 170 can also receive some of the calls that the primary private branch exchange 150 is not able to handle.

Once the incoming call is received, the primary private branch exchange 150 works as the call center environment for all calls directed to the language access number by the LEP caller. The primary private branch exchange 150 and the redundant private branch exchange 170 are connected to the public switch network 110 through an optical carrier 3 (OC3) line or similar facilities. In one embodiment, the OC3 line can have a capacity of 155.52 megabits per second.

In another embodiment, the primary private branch exchange 150 is connected to a communications gateway 152 which works as a hub and router of calls handled by the primary private branch exchange 150. The communication gateway 152 can also have the capability of compressing voice and data associated with the incoming phone call from the LEP caller 122. Thus, the data transmitted out of the communication gateway 152 is sampled down to smaller data packages thus limiting the occupation time of the telephone network, thereby reducing costs associated with transmission of data. The communication gateway 152 can, for example, be implemented by the use of a Multiservice Media Gateway box which has the capability of voice and data compression as well as call routing.

In one embodiment, the private branch exchange 150 and the communication gateway 152 are communicated to a plurality of services that allow for communications support. For example, a computer telephony integration system 154 permits communication through the communication gateway 152 and serves to manipulate and route incoming and outgoing phone calls. The computer telephony integration system 154 collects data pertaining to the incoming and outgoing calls. This data can be, for example, caller information, automatic number identification (ANI), time and date when the phone call was started, time and date when the phone call ended, the total number of minutes, associated third parties connected to the phone call, etc. Call and customer information received and processed by computer telephony integration system 154 can then be relayed to a database server 160 which then stores all the information in a records database 162.

In one embodiment, the primary private branch exchange 150 utilizes is an interactive voice response system 156. The interactive voice response system 156 automatically responds to the incoming phone calls from LEP caller 122 and can provide language interpretation options as well as other options that can allow the LEP caller 122 to customize the circumstances of the call, and specific needs of the LEP caller 122. The data collected by the interactive voice response system 156 can be relayed to provide a description to interpreter 101 of what kind of service the LEP caller 122 is requesting. The interactive voice recognition system 156 can be further configured to recognize multiple languages and dialects so as to better assist the LEP caller 122. In addition, the interactive voice recognition system 156 can be equipped with logic to categorize the type of language (e.g., Asian, Arabic, Latin, and Germanic). Finally, a call metrics server 158 collects data that is recorded also in the records database 162. The call metrics server 158 collects data regarding volume and statistical analysis for such data as the number of interpreters available, current speed of answer, number of phone calls on hold, number of phone calls made within a certain time period, etc.

In another embodiment, the collected statistical information and analysis can be utilized by the computer telephony integration system 154 which, in turn, can report back to interactive voice response system 156. In a mirror-like fashion, the redundant private branch exchange 170 includes similar components that are connected to the redundant private branch exchange 170. For example, the redundant private branch exchange 170 is connected to a communications gateway 172 which also allows for data compression and voice compression and for routing calls to an international global gateway 174 or back to the communication gateway 152. The redundant private branch exchange 170 also has a multiplicity of services that allow the redundant private branch exchange 170 to receive incoming phone calls, process them and reroute them to the designated specific language interpreter 101. Thus, the redundant private branch exchange 170 can be connected to a computer telephony integration system 176, to an interactive voice response system 178, and to a database server 180 which in turn has access to a records database 182. In another embodiment, the redundant private branch exchange 170 is also connected to the call metrics server collocated with the primary private branch exchange 150.

In yet another embodiment, the communication gateway 152 as well as the communication gateway 172 can communicate to global gateway 174 through an international private line 153. The international private line 153 can be a T1 private line (e.g. PSAX 8 kilobytes voice). The global gateway 174 can be placed in a different country from where the primary private branch exchange 150 and the redundant private branch exchange 170 are located. This allows the language interpretation provider 100 the ability to expand and have global centers 164, 166, and 168 in other parts of the world thus allowing the language interpretation provider 100 to service a greater number of languages serviced. Because a global center can be located in a specific country where the communication skills and language knowledge base are better, the language interpretation provider 100 can provide a vast array of language interpretation without having to train interpreters 101 connected to a North America primary private branch exchange 150. Yet another positive aspect of having global centers 164, 166, and 168 is that the costs for language interpretation services can be reduced since the local wages can be lower. As such, the concentration of native speakers in each country increases the pool of talent making the language interpretation provider 100 flexible to service a greater number of LEP callers 122.

For example, global centers can be placed in the Dominican Republic, Costa Rica, and Panama. Each of these global centers can include a plurality of employees fluent both in English and Spanish. The global centers 164, 166, and 168 can permit the data to be transmitted from one of the local global centers at which the interpreter 101 is located to the global gateway 174, and to the primary private branch exchange 150. The call is then carried through the public switch network and to the LEP caller 122 as well as the customer representative 134 or the customer representative 138 depending on which merchant is connected. In another embodiment, the number of global centers can vary such that the size of the language interpretation provider 100 increases by simply scaling up the number of global centers located in each of the localities around the world. The interpreter 101 services can also be provided directly from North America and do not have to be localized in different countries.

In another embodiment, a single line analog interpreter 102 can be communicated directly through the public switch telephone network 110 so that when the incoming call is received by the primary private branch exchange 150, the call is rerouted to the single line remote interpreter 102. Typically, the single line interpreter 102 can only be accessible telephonically. In another embodiment, a remote interpreter 101 that is not located at the place of business of the language interpretation services can also be located at his home and can, for instance, be located at, or communicated through, a digitally extended business phone 104. The digitally extended business phone 104 provides voice-only communication and allows for remote identification. As such, the call is routed to a digitally extended business phone 104 through the primary private branch exchange 150, and makes it appear to the other entities within the communication network as if the telephone number and the remote worker would be working at the place of business of the language interpretation provider 100.

In yet another embodiment, the remote worker 106 can be connected via broadband such that the remote worker 106 can be connected to either the internet 108 or a virtual private network (VPN) in order to provide voice services and data. The capability of broadband allows the interpreter 101 to receive audio through the voice channel as well as data. Data received by the interpreter 106 include such data as written text or other necessary information that can permit the interpreter 101 to read written text and images to be more helpful to the LEP caller 122. For example, when the LEP caller 122 tries to make a reservation, the remote call worker 106 can have the same information (e.g. a website) that the customer service representative 124 has in his computer monitor. Therefore the remote worker 106 can better assist the LEP caller 122 because the remote worker 106 has instant access at his computer thus permitting the LEP caller 122 to be informed about data that the LEP caller 122 can otherwise not be able to read.

Figure 2A:
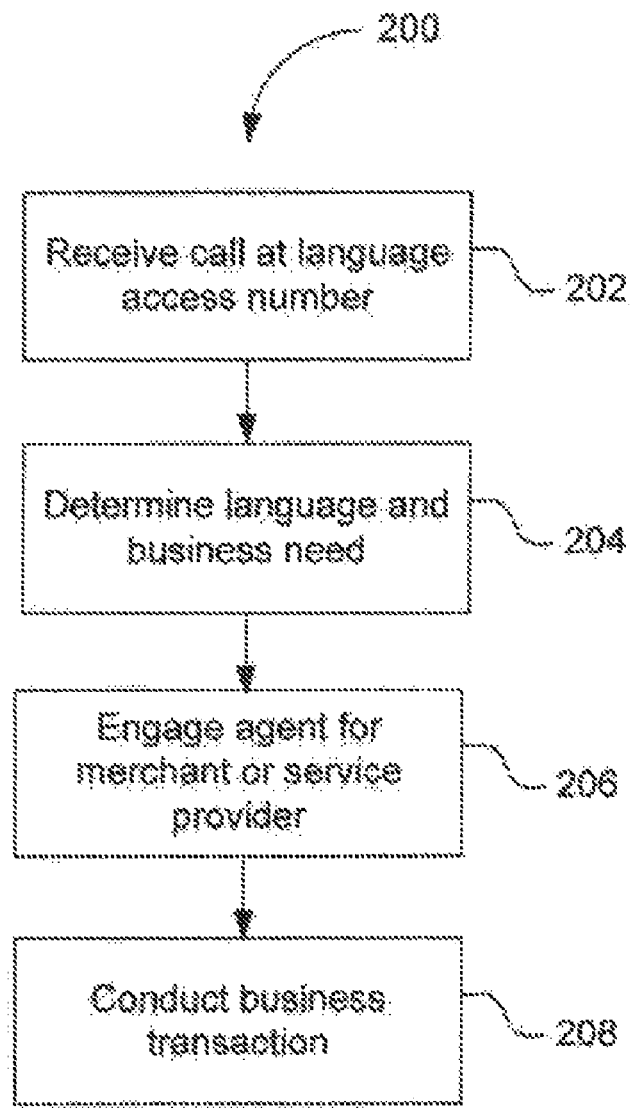
FIG. 2A illustrates a flow diagram for a process to service a customer call to the language access number.

FIG. 2A illustrates a flow diagram for a process 200 to service a customer call to the language access number. At process block 202, an inbound call is received. The call is the result of the LEP caller 122 dialing the language access number. As previously stated, the language access number can be a toll-free number or a customer-paid service. In addition, the number can be any combination of numbers. If the number is in the United States, for example, the number can start with the prefix 800. In another example, the number can be 811. The process 200 then continues to process block 204.

At process block 204, the language required by the LEP caller 122 is determined. Furthermore, at process block 204 the business need, service required, or any other request by the LEP caller 122 can also be determined. The process 200 continues to process block 206.

At process block 206, the appropriate agent for the merchant or service provider is engaged. For example, once the LEP caller 122 expresses a specific need or requirement, and the correct type of service is identified, an analysis can be made to determine a business organization or entity that can provide the goods or services required by the LEP caller 122. For example, the LEP caller 122 may request banking services without a specific bank name. In one embodiment, the language service provider chooses from a list of subscriber banks. In another embodiment, the language service provider chooses a bank at random to provide service to the LEP caller 122. The process then continues to process block 208 wherein the business transaction required by the LEP caller 122 is conducted with the business entity.

Figure 2B:
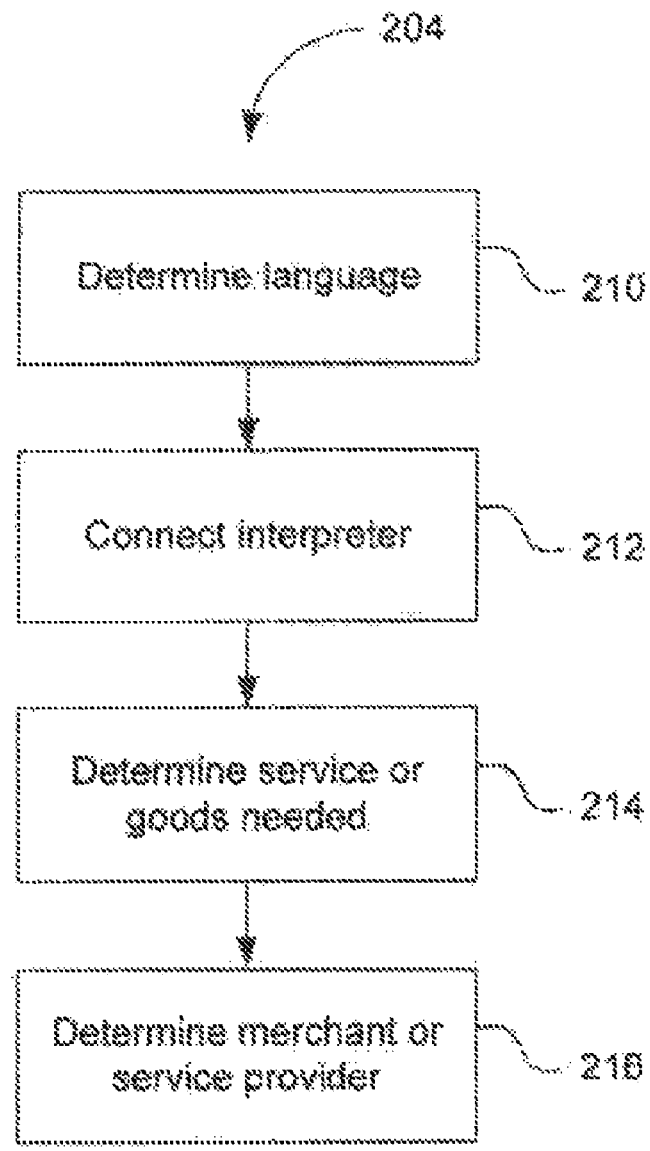
FIG. 2B illustrates a flow diagram for a process to handle an incoming call that was dialed using a language access number.

FIG. 2B illustrates a flow diagram for a process 204 to handle an incoming call that was dialed using a language access number. At process 204, the language and business needs of the LEP caller 122 are determined.

At process block 210, the language spoken by the LEP caller 122 is identified. Various algorithms and methods can be utilized to correctly and quickly identify the language spoken by the LEP caller 122. In one embodiment, linguists or other language experts can be utilized first to determine the root of the language. In another example, voice recognition systems can be used to determine the language. The process 204 then continues to process block 212.

At process block 212, an interpreter 101 is connected based on the language identified at process block 210. The interpreter 101 can then help the LEP caller 122 to determine the problem or need of the LEP caller 122. In addition, the interpreter 101 can connect the LEP caller 122 with an agent of a business entity that provides that solution, product or service. The process 204 then continues to process block 214.

At process block 214, the goods or services needed by the customer are determined. Thus, business need, service required, or any other request by the LEP caller 122 can also be determined. In one example, the LEP caller 122 is inquired about the reason for the call, or the services needed by the LEP caller 122. The LEP caller 122 can identify exactly his or her needs such as banking, travel agencies, airlines, car rental companies, health care services, entertainment services, emergency, geographical information, weather information, etc. Once the business needs of the LEP caller 122 are identified, the process 204 then continues to process block 216.

At process block 216, the merchant, business entity, or service provider are determined. In one embodiment, the interpreter 101 can determine the merchant or service provider that can best assist to resolve the LEP caller's 122 needs. In one example, the interpreter 101 engages an agent of the business entity that the interpreter 101 believes to be the most appropriate to address the LEP callers 122 needs. In another example, the interpreter 101 can give the LEP caller 122 the option of selecting the business entity among a list of entities capable of addressing the LEP caller's 122 needs. In another embodiment, the LEP caller 122 requests for a specific merchant or service provider that can best assist to resolve the LEP caller's 122 needs.

Figure 3:
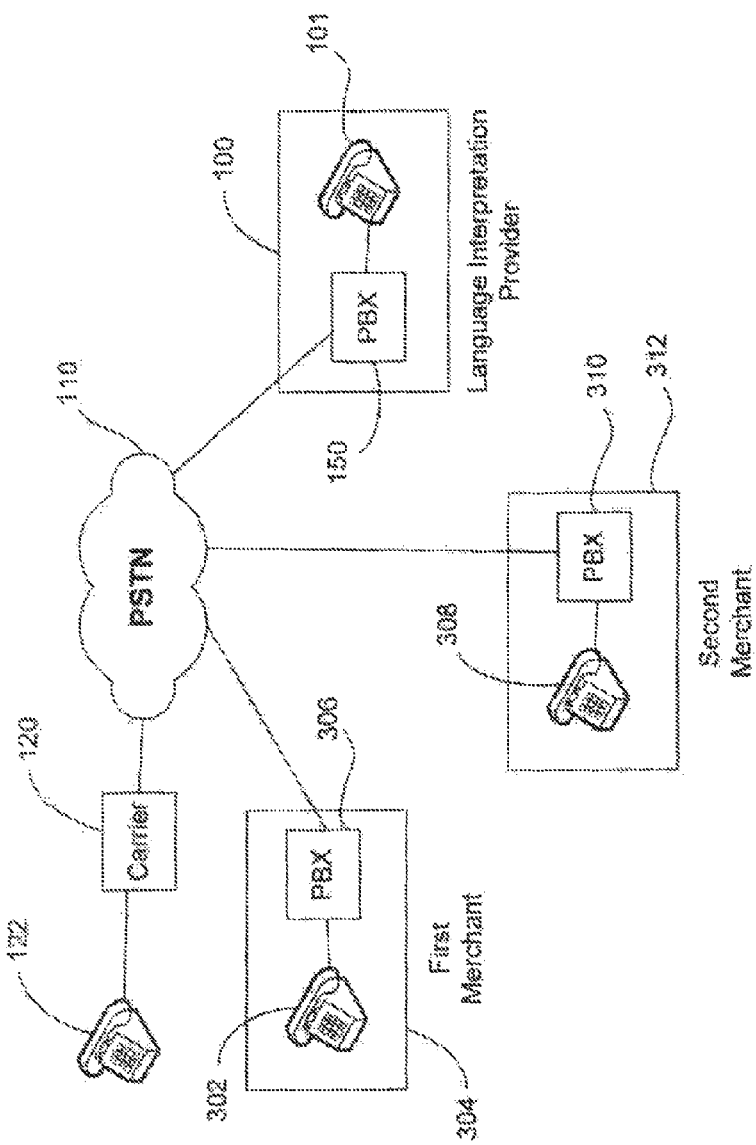
FIG. 3 illustrates an alternative component diagram of a language interpretation service.

FIG. 3 illustrates an alternative component diagram of a language interpretation service. As previously stated, the interpreter 101 assists the LEP caller 122 to determine what type of business need, or service the LEP caller 122 requires. In one embodiment, the interpreter 101 assists the LEP caller 122 to transact business with a first merchant 304 and with a second merchant 312.

The interpreter 101 can connect the phone call, through the public switch telephone network 110, to a customer service representative 302 of the first merchant 304 through a corresponding private branch exchange 306.

Once the transaction with the first merchant 304 has finished, the LEP caller 122 can be connected to a second merchant 312 through the public switch network 110. As such, after the LEP caller 122 finishes the transaction with the first merchant 304, the interpreter 101 can stay on the line with the LEP caller 122 and interpret a business transaction between the LEP caller 122 and the second merchant 312. Thus, the interpreter 101 can further assist the LEP caller 122 to determine any further business need that the LEP caller 122 may have.

In one example, the phone call can be connected to the second merchant 312 through a private branch exchange 310 to the customer service representative 308 which can be an employee of the second merchant 312.

In one embodiment, the merchant 304 and the second merchant 312 are business partners such that when a phone call is received by the merchant 312, the merchant 312 can be able to offer services that are complemented or supplemented by the services or the products provided by the second merchant 304.

Figure 4:
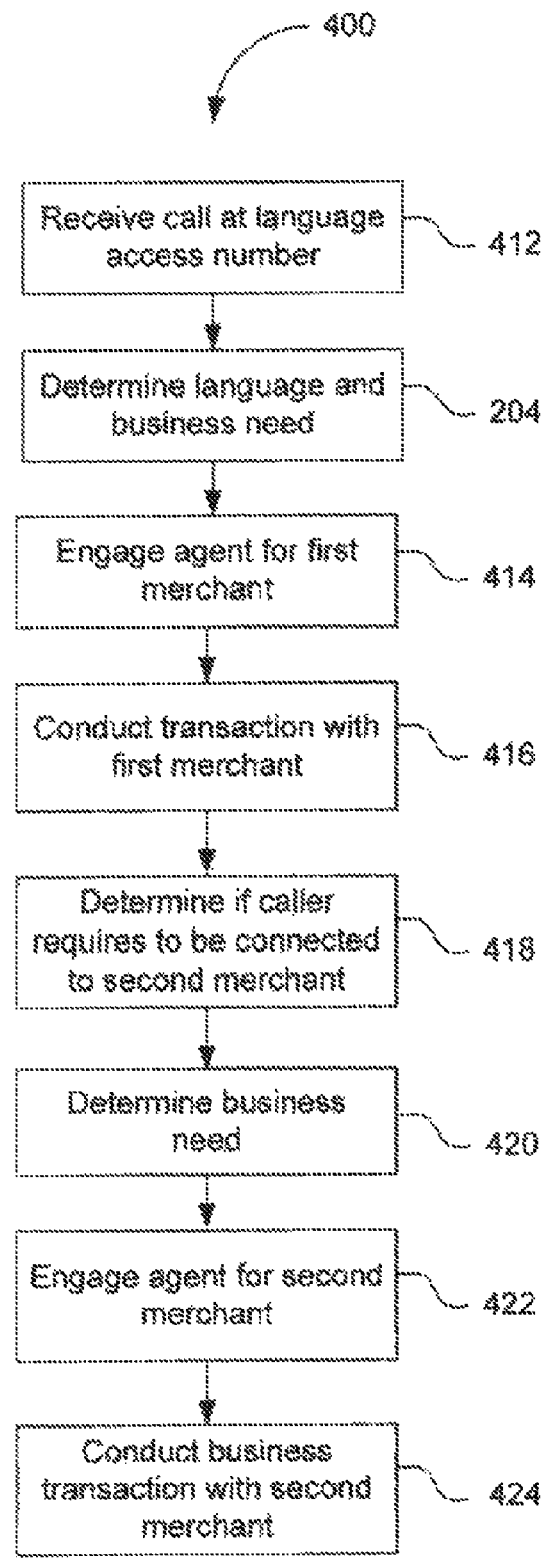
FIG. 4 illustrates an alternative flow diagram for a process to service a customer call to the language access number.

FIG. 4 illustrates an alternative flow diagram for a process 400 to service a customer call to the language access number. At process block 412, a call from the LEP caller 122 is received. The LEP caller 122 calls the language access number in order to be provided with language assistance to conduct one or more transactions. The language access number can be, for example, an 811 number. The process 400 continues to process block 204.

At process block 204, the language required to communicate with the LEP caller 122 is determined. Furthermore, at process block 204 the business need, service required, or any other request by the LEP caller 122 can also be determined. The process 400 continues to process block 414.

At process block 414, an agent for the first merchant is engaged. In one embodiment, the first merchant can be selected by the interpreter. In another embodiment, the first merchant can be selected by the LEP caller 122. The process 400 continues to process block 416.

At process block 416, the transaction between the LEP caller 122 and the first merchant is conducted. The transaction can be assisted by the interpreter 101 who can translate from the language of the LEP caller 122 to the language of the agent for the first merchant, and vice versa. The process 400 continues to process block 418.

At process block 418, a determination is made as to whether the LEP caller 122 requires to be connected to another merchant. The interpreter can inquire to the LEP caller 122 whether the LEP caller 122 has further business needs. The LEP caller 122 may require service from another service provider, or may wish to purchase goods from another merchant, etc. If the LEP caller 122 requires further transactions, the process 400 continues to process block 420.

At process block 420, the business entity or service provider is determined. Therefore, once the business need of the LEP caller 122 is identified, an appropriate business entity can be identified so as to provide the services or goods required by the LEP caller 122. The process 400 continues to process block 422.

At process block 422, the interpreter can engage an agent of the second business entity identified as capable to provide services or goods to the LEP caller 122. The interpreter can then start to provide interpretation services between the second merchant or service provider and the LEP caller 122. Therefore, at process block 424 a business transaction is conducted with the second merchant.

Billing

Figure 5:
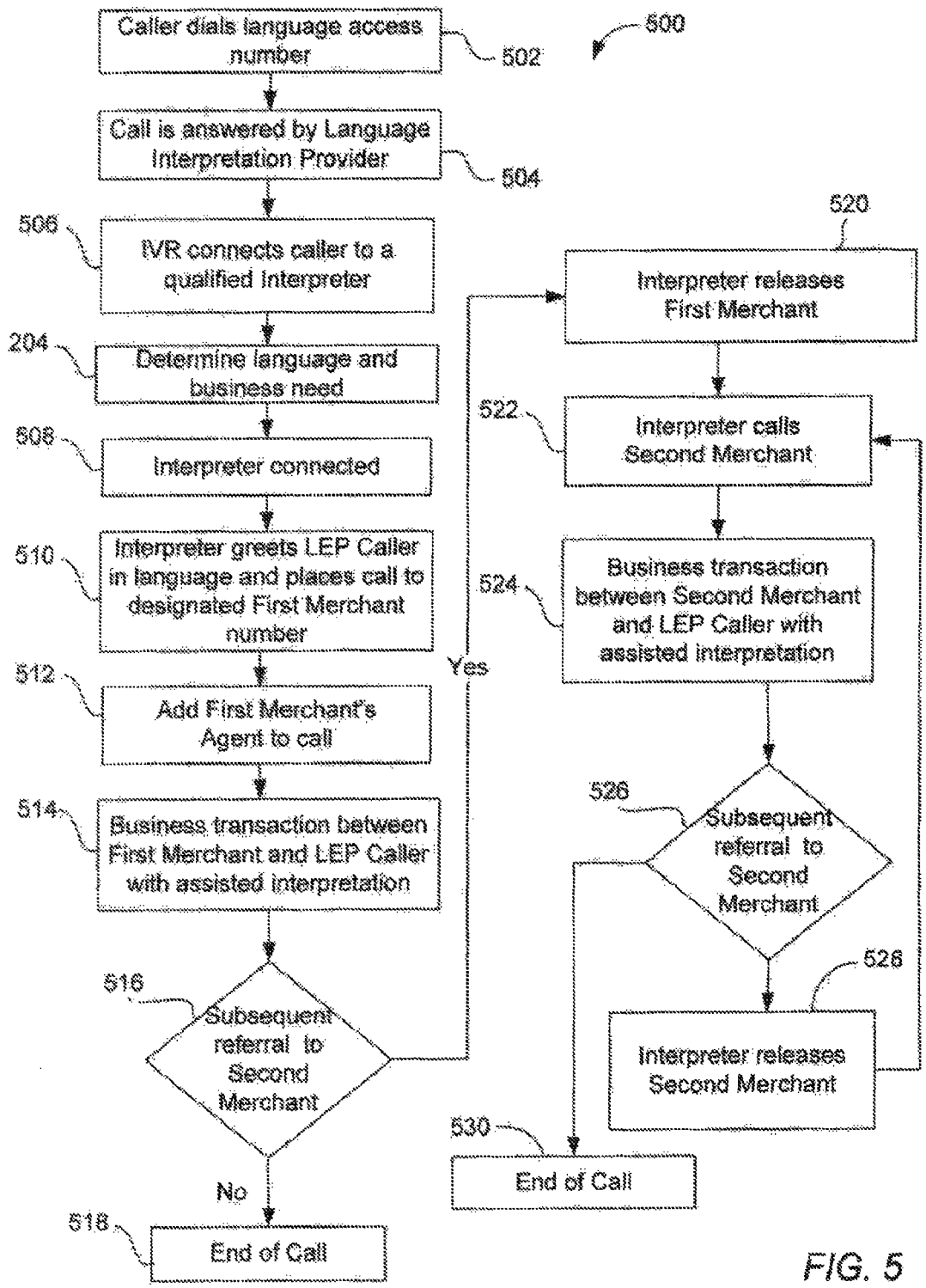
FIG. 5 illustrates a call flow diagram for a process wherein a customer calls a language number.

Various billing configurations can exist. In one embodiment, a first billing starts from connection time of the LEP caller 122 with the destination of language access number. Furthermore, there can be a second billing that starts when a business, merchant or service provider is engaged with the LEP caller 122 while an interpreter 101 interprets the business transaction. Finally, there can be a third billing that starts when a subsequent business, merchant or service provider is engaged with the LEP caller 122 while an interpreter 101 interprets a subsequent business transaction. In another embodiment, one single billing can be provided in which only one party FIG. 5 illustrates a call flow diagram for a process wherein a customer calls a language number. In process block 502, the LEP caller 122 dials a language assistance telephone number (e.g. 811). The LEP caller 122 dials the language assistance number in order to receive customer service assistance in the language that is requested by the LEP caller 122.

In process block 502, the call is received by the language interpretation provider 100. As such, the inbound call received in process block 504 can be received at primary private branch exchange 150. In addition, in process block 504 a first billing begins. In one embodiment, the first billing is charged to the governmental body. U.S. Federal regulations provide that equal access to basic services must be provided to all individuals, which includes language access. For example, under U.S. Federal regulations, any entity, including states and local governments, receiving federal funding must provide equal access to their services. Therefore, some government bodies can commit to pay for the costs of language access calls.

In another embodiment, the first billing is charged to the merchant or service provider with whom the call is connected and with whom the LEP caller 122 conducts business. The merchant has the incentive that further business can be created if the LEP caller 122 is provided with interpretation services. In another embodiment, the first billing cost is charged to the LEP caller 122. In yet another embodiment, the first billing cost is absorbed by the language interpretation provider 100.

Next, in process block 506 the interactive voice response connected to the primary private branch exchange 150 can lead the LEP caller 122 through a series of questions that requires the input of at least one keystroke on the telephone handset. In one embodiment, the interactive voice response system 156 can request the customer to say the language that the customer requires or would utilize to conduct a business transaction with the merchant 304. After the information is gathered from the LEP caller 122, the interactive voice response system 156 can connect the caller to the interpreter 101. Furthermore, the interactive voice response system 156 can also prompt the LEP caller 122 for a broad category of the type of service that the LEP caller 122 requires. For example, the caller may call to inquire about pharmacy services, and to be connected to a pharmacy. The interactive voice response system 156 can receive the data from the LEP caller 122 and relay it to the interpreter 101 so that the interpreter 100 is best prepared for assisting the LEP caller 122. For example, the interpreter can start locating pharmacies in the area while the LEP caller 122 is being transferred. In another embodiment, the interpreter 101 has a telephone connection to receive data plus control information so that the interpreter 101 can best provide service to the LEP caller 122.

In process block 508 the first billing stops and the second billing begins. In one embodiment, the second billing is charged to a governmental body. In another embodiment, the second billing is charged to the merchant 304. Besides providing merchant 304 an incentive to pay for the call by increasing business for merchant 304, when the call is transferred to merchant 304 and charged to merchant 304, a governmental body may be further induced to pay for the first billing which is only the first few minutes of the call. After the interpreter 101 has been connected, the services of interpretation start running for the benefit of merchant 304, and therefore the merchant 304 can be charged for the second billing. In another embodiment, the LEP caller 122 can pay for the second billing. In yet another embodiment, the second billing cost is absorbed by the language interpretation provider 100.

The interpretation time is charged to the merchant 304 as soon as the interpreter 101 is connected. As such, in process block 508, the call is then rerouted to an interpreter 101 who answers the call in the language identified. In one embodiment, the interpreter 101 can be provided with a specific signal (e.g. audio or visual) indicating specific information that the LEP caller 122 is requesting. The signal can be sent from the interactive voice response system 156. As such, the interpreter 101 can serve multiple merchants. With the appropriate signal received, the interpreter 101 can then greet the inbound call appropriately. For example, if the LEP caller 122 calls a the language access number wanting to be connected to a car rental company, the language interpretation provider 100 through the interactive voice response system 156 can determine that the LEP caller 122 is calling regarding rental car services. When the interpreter 101 receives the call data regarding the LEP caller 122 needing rental car services can also be provided to the interpreter. Therefore, the interpreter 101 can better assist the language interpretation provider 100.

Then in process block 510 the interpreter 101 upon being connected greets the LEP caller 122. Because the interpreter 101 knows that the LEP caller 122 is a caller requiring the specific language that the interpreter 101 is qualified to provide, the interpreter 101 can immediately assume that the call can be conducted in the language the interpreter 101 is qualified to interpret. The interpreter 101 then requests information from the LEP caller 122 as to what type of service the LEP caller 122 requires. If the data received by the interpreter 101 indicates that the customer or that the LEP caller 122 requested specific a service, then the interpreter 101 does not need to request the LEP caller 122 to provide any further information. For example, the LEP caller 122 can tell the interpreter 101 that the LEP caller 122 is calling to inquire about signing up for new service. However, if in process block 506 the interactive voice response system 156 prompted the LEP caller 122 with the question of whether new service is required or not, and the LEP caller 122 affirmed that new service is required, then such information can be relayed directly to the interpreter 101. The information is related through previously provided equipment to the interpreter 101 so that the interpreter 101 is then on notice that the LEP caller 122 requires new service. If the agent of the merchant 304 is English speaking only, the interpreter 101 can interpret the business transaction between the English-speaking agent and the LEP caller 122.

In process block 512, the first merchant's 304 agent is added to the call thus effectively initiating a three-way call in which the interpreter 101 and the LEP caller 122 were initially connected, and the first merchant's 304 agent was added later. In process block 514, the business transaction between the first merchant's 304 agent and the LEP caller 122 is conducted. This business transaction is a possible because of the interpretation services that the interpreter 101 provides. In other words, the interpreter can translate the LEP caller's 122 statements into the language spoken by the agent of the first merchant 304, and can further translate the statements made by the first merchant's 304 agent into the language spoke by the LEP caller 122.

In one embodiment, the language spoken by the merchant 304 can be English, Spanish, or any other language that is official to the merchant 304. The language being interpreted is, of course, the language required by the LEP caller 122 to conduct business with the merchant 304.

In one embodiment, the LEP caller 122 can be a caller proficient in Spanish requesting interpretation from Spanish to English. The LEP caller 122 may dial the language access number (e.g., 811) to make inquiries and to receive services from one or more business entities. Each of the business entities or merchants may speak only English. For example, the merchant can be an electronics store that provides services in English. The LEP caller 122 speaks only Spanish and requests access to the electronics store services to the language interpretation provider 100. Interpretation provider 100 can then connect the call to the interpreter 101 so that the interpreter 101 can speak Spanish with the LEP caller 122 and English with the electronics store.

In another embodiment, the LEP caller 122 can be a caller proficient in English requesting interpretation from another language to English, where the business speaks a language other than English. For example, the business can be a Korean airline and provides services in Korean. An English-speaking caller requesting access to Korean services can call the language interpretation provider 100. Interpretation provider 100 can then connect the call to the interpreter 101 so that the interpreter 101 can interpret Korean with the merchant 304 and English with the LEP caller 122. In this case, of course, the caller does not necessarily have a limited English proficiency, but rather, the caller is not proficient in Korean language.

In decision block 516 after the business transaction has been conducted with the merchant 304, the LEP caller 122 queried as to whether a subsequent referral to a partner or a second merchant 312 is required. In one embodiment the second merchant 312 is a partner of the merchant 304 that provides supplementary or complementary businesses, services and products to the merchant 304. One of supplementary services can be a rental car agency to an airline reservation system or a hotel reservation system. Another example of supplementary services is a doctor's office and a pharmacy.

If it is decided that the LEP caller 122 does not require any more assistance or referral to other merchants or services providers, the process continues to process block 518. At process block 518, the call ends, and the first billing stops.

On the other hand, if it is determined that the LEP caller 122 requires further services or business assistance, the process 500 continues at process block 520. At process block 520, the interpreter 101 releases the first merchant 304 from the three-way call taking place between the interpreter 101, the first merchant 304, and the LEP caller 122. As soon as the interpreter 101 releases the merchant 304 from the call, the second billing stops. Furthermore, a third billing begins. In one embodiment, the third billing is charged to the governmental body. In another embodiment, the third billing is charged to the merchant or service provider with whom the call will be ultimately connect and with whom the LEP caller 122 will conduct business. In another embodiment, the third billing cost is charged to the LEP caller 122. In yet another embodiment, the third billing cost is absorbed by the language interpretation provider 100.

In process block to 522, the interpreter 101 calls the second merchant 312. In another embodiment, the second billing does not start until the call is connected to the second merchant. Next in process block 524 the business transaction between the second merchant 312 and the LEP caller 122 is conducted. The business transaction is connected with the assisted interpretation of interpreter 101. At decision block 526, it is determined whether a subsequent referral to another merchant is required by the LEP caller 122. The LEP caller 122 may decide to request a new merchant depending on the business need of the LEP caller 122. For instance, the LEP caller 122 may decide that he needs services supplementary to the services just provided by the second merchant 312. Examples of supplementary services can be hotel reservation systems and airline reservation systems. A third supplementary service to be provided could be, for example, a car rental service. Many other combinations of business partnerships exist where each business partner provides supplementary products or services to the other business partner. If the LEP caller 122 decides to request a third merchant, at process block 528 the interpreter 101 releases the connection with the second merchant 312 from the phone call and the third billing stops. At that point, the interpretation services for the second merchant 312 have finished. In one embodiment, the second merchant 312 will no longer be charged for interpretation services. In addition, in another embodiment, a fourth billing can start.

After process block 528, the interpreter 101 calls the subsequent merchant that will provide services to the LEP caller 122. Furthermore, at decision block 526, the LEP caller 122 can again decide that further assistance is needed. Finally if the LEP caller 122 decides at decision block 526 that no further referrals to a merchant are necessary, the call is finished and at process block 530 the interpreter 101 ends the call at process block 530 and therefore any further billing stops.

Although certain illustrative embodiments and methods have been disclosed herein, it can be apparent form the foregoing disclosure to those skilled in the art that variations and modifications of such embodiments and methods can be made without departing from the true spirit and scope of the art disclosed. For example, although all of the examples refer to a limited-English proficient costumer, the language interpretation paradigm can apply to any language spoken by the customer and/or the private or public entity with which the customer wants to transact business.

Many other examples of the art disclosed exist, each differing from others in matters of detail only. Accordingly, it is intended that the art disclosed shall be limited only to the extent required by the appended claims and the rules and principles of applicable law.

What is claimed is:

1. A method of providing a language interpretation service, comprising:
providing a language access telephone number that a caller speaking a first language and having a business need dials to place a telephone call to a language interpretation service to obtain language interpretation assistance;
receiving a language access telephone call at the language interpretation service provider from the caller;
identifying, after the telephone call is initiated, the first language from a plurality of languages with a voice recognition system so as to provide the caller with an interpreter that can translate between the first language and a second language, wherein the interpreter is associated with the language interpretation service provider; and
permitting the interpreter to telephonically engage an agent representing a merchant that can serve the business need of the caller, wherein the agent speaks the second language and the interpreter translates a conversation between the caller and the agent.

2. The method of claim 1, wherein the language access telephone number is a toll-free number.

3. The method of claim 1, wherein the language access telephone number is 811.

4. The method of claim 1, further comprising determining whether the caller elects to be telephonically connected to a business partner of the merchant, wherein if the caller elects to be connected to the business partner, the interpreter telephonically engages a partner agent representing the business partner, wherein the partner agent speaks the second language and the interpreter translates a subsequent conversation between the caller and the partner agent.

5. The method of claim 1, further comprising identifying a type of business need of the caller.

6. The method of claim 1, further comprising identifying the merchant that can address the business need of the caller.

7. The method of claim 1, further comprising establishing a first billing that accounts a time count accruing from a time at which the language access telephone call starts until a time at which the agent representing the merchant is engaged.

8. The method of claim 7, wherein the first billing is paid by a government entity, a business entity, the interpretation service provider, or the caller.

9. The method of claim 1, further comprising establishing a second billing that accounts a time count accruing from a time at which the agent representing the merchant is engaged until at time at which the partner agent is engaged.

10. The method of claim 9, wherein the second billing is paid by a government entity, a business entity, the interpretation service provider, or the caller.

11. The method of claim 1, wherein the conversation between the caller and the agent relates to a business transaction between the caller and the merchant.

12. The method of claim 1, wherein the merchant is a bank, a health care provider, a government entity, an airline, a rental car agency, a hotel, a travel agency, an amusement park, a resort, a casino, a cruise line, a public transportation agency, a financial company, an insurance company, or a telecommunications company.

13. The method of claim 1, wherein the first language is English, Spanish, German, French, or Chinese.

14. The method of claim 1, wherein the second language is English, Spanish, German, French, or Chinese.

15. The method of claim 1, wherein the language access telephone call is first received by a private branch exchange that routes the telephone call to the interpreter, the interpreter being located remotely from the business facilities of the language interpretation service provider.

16. A method of providing language interpretation service, comprising:
providing a language access telephone number wherein that a caller speaking a first language and having a business need dials to place a telephone call to a language interpretation service to obtain language interpretation assistance;
receiving a language access telephone call at the language interpretation service provider from the caller;
identifying, after the telephone call is initiated, the first language from a plurality of languages with a voice recognition system so as to provide the caller with an interpreter that can translate between the first language and the second language, wherein the interpreter is associated with the language interpretation service provider;
permitting the interpreter to telephonically engage a first agent representing a first business distinct from the language interpretation service provider that can serve a business need of the caller, wherein the first agent speaks the second language and the interpreter translates a conversation between the caller and the first agent; and
determining whether the caller elects to be connected to a second business, wherein if the caller elects to be connected to a second business the interpreter telephonically engages a second agent representing the second business, wherein the second agent speaks the second language and the interpreter translates a second conversation between the caller and the second agent.

17. The method of claim 16, wherein the language access telephone number is a toll-free number.

18. The method of claim 16, wherein the language access telephone number is 811.

19. The method of claim 16, wherein the second business is a business partner of the first business.

20. The method of claim 16, further comprising identifying a type of the business need of the caller.

21. The method of claim 16, further comprising identifying the first business that can address the business need of the caller.

22. The method of claim 16, further comprising establishing a first billing that accounts a time count that accrues from a time at which the language access telephone call starts until a time at which the first agent is engaged.

23. The method of claim 22, wherein the first billing is paid by a government entity, a business entity, the interpretation service provider, or the caller.

24. The method of claim 16, further comprising establishing a second billing that accounts a time count accruing from a time at which the first agent is engaged until a time at which the first agent is released.

25. The method of claim 24, wherein the second billing is paid by a government entity, a business entity, the interpretation service provider, or the caller.

26. The method of claim 16, wherein the first conversation between the caller and the first agent relates to a business transaction between the caller and the first business, wherein the business transaction satisfies the business need of the caller.

27. The method of claim 16, wherein the first business is a bank, a health care provider, a government entity, an airline, a rental car agency, a hotel, a travel agency, an amusement park, a resort, a casino, a cruise line, a public transportation agency, a financial company, an insurance company, or a telecommunications company.

28. The method of claim 16, wherein the second business is a bank, a health care provider, a government entity, an airline, a rental car agency, a hotel, a travel agency, an amusement park, a resort, a casino, a cruise line, a public transportation agency, a financial company, an insurance company, or a telecommunications company.

29. The method of claim 16, wherein the first language is English, Spanish, German, French, or Chinese.

30. The method of claim 16, wherein the second language is English, Spanish, German, French, or Chinese.

31. The method of claim 16, wherein the telephone call is first received by a private branch exchange that routes the telephone call to the interpreter, the interpreter being located remotely from the business facilities of the language interpretation service provider.

32. A system for providing language interpretation, comprising:
an incoming call telephonic module associated with a language interpretation provider that (i) receives an incoming telephone call from a caller speaking a first language and having a business need that dials a language access telephone number to obtain language interpretation assistance and (ii) identifies, after the telephone call is initiated, the first language from a plurality of languages with a voice recognition system so as to provide the caller with an interpreter that can translate between the first language and a second language; and
an outgoing call telephonic module that permits the interpreter to telephonically engage an agent representing a merchant that can serve the business need, wherein the agent speaks a second language and the interpreter translates a conversation between the caller and the agent.

33. The system of claim 32, wherein if the caller elects to be connected to a business partner of the merchant, the outgoing call telephonic module further permits the interpreter to telephonically engage a partner agent representing the business partner, wherein the partner agent speaks the second language and the interpreter translates a conversation between the caller and the agent.

34. The system of claim 32, wherein the language access telephone number is a toll-free number.

35. The system of claim 32, wherein the language access telephone number is 811.

36. The system of claim 32, further comprising a billing module configured to establish a first billing that accounts a time count accruing from a time at which incoming telephone call starts until at time at which the agent representing a merchant is engaged.

37. The system of claim 36, wherein the first billing is paid by a government entity, a business entity, the interpretation service provider, or the caller.

38. The system of claim 32, further comprising a billing module configured to establish a second billing that accounts a time count accruing from a time at which the agent representing the merchant is engaged until the partner agent is engaged.

39. The system of claim 38, wherein the second billing is paid by a government entity, a business entity, the interpretation service provider, or the caller.

40. The system of claim 32, wherein the conversation between the caller and the agent relates to a business transaction between the caller and the merchant.

41. The system of claim 32, wherein the merchant is a bank, a health care provider, a government entity, an airline, a rental car agency, a hotel, a travel agency, an amusement park, a resort, a casino, a cruise line, a public transportation agency, a financial company, an insurance company, or a telecommunications company.

42. The system of claim 32, wherein the first language is English, Spanish, German, French, or Chinese.

43. The system of claim 32, wherein the second language is English, Spanish, German, French, or Chinese.

44. The system of claim 32, wherein the telephone call is first received by a private branch exchange that routes the telephone call to the interpreter, the interpreter being located remotely from the business facilities of the language interpretation service provider.

* * * * *